(12) United States Patent
Itoh et al.

(10) Patent No.: US 7,261,532 B2
(45) Date of Patent: Aug. 28, 2007

(54) IN-MOLD DECORATION APPARATUS AND HORIZONTAL DIRECTION DECORATING SHEET FEEDING MACHINE

(75) Inventors: Tadahiro Itoh, Kyoto (JP); Masao Kawai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 222 days.

(21) Appl. No.: 10/857,954

(22) Filed: Jun. 2, 2004

(65) Prior Publication Data

US 2005/0271760 A1 Dec. 8, 2005

(51) Int. Cl.
*B29C 45/17* (2006.01)
*B29C 33/68* (2006.01)

(52) U.S. Cl. ...................... 425/89; 425/126.1

(58) Field of Classification Search ............. 425/126.1, 425/89
See application file for complete search history.

(56) References Cited

U.S. PATENT DOCUMENTS

| 4,545,752 | A | * | 10/1985 | Hanamoto et al. ......... 425/112 |
| 5,000,903 | A | * | 3/1991 | Matzinger et al. ......... 264/511 |
| 5,891,483 | A | * | 4/1999 | Miyajima ................... 425/89 |

FOREIGN PATENT DOCUMENTS

| JP | 61-297149 | | 12/1986 |
| JP | 2003053779 | A * | 2/2003 |
| JP | 2004098514 | A * | 4/2004 |
| JP | 2004-181885 | | 7/2004 |

OTHER PUBLICATIONS

Partial machine translation of JP2003-053779A obtained from the JPO website.*
Partial machine translation of JP2004-098514A obtained from the JPO website.*

* cited by examiner

*Primary Examiner*—Robert B. Davis
(74) *Attorney, Agent, or Firm*—Wenderoth, Lind & Ponack, L.L.P.

(57) ABSTRACT

In an in-mold decoration apparatus, with decorating sheets pinched between a fixed mold half and a movable mold half, molten resin is injected into the mold so that the decorating sheets are respectively bonded to surfaces of a resin molded article. The in-mold decoration apparatus includes a vertical direction decorating sheet feeding machine for performing the feed and take-up of the decorating sheet in the vertical direction, and a horizontal direction decorating sheet feeding machine for performing the feed and take-up of the decorating sheet in the horizontal direction, so that the in-mold decoration apparatus can be set up even with a narrow installation space.

4 Claims, 9 Drawing Sheets

IN-MOLD DECORATION APPARATUS AND HORIZONTAL DIRECTION DECORATING SHEET FEEDING MACHINE

BACKGROUND OF THE INVENTION

1. Field of the Invention

The present invention relates to an in-mold decoration apparatus and a horizontal direction decorating sheet feeding machine each of which is suited to doing decoration on resin molded articles by using two decorating sheets.

2. Description of Related Art

One of conventional methods for decorating the surface of a resin molded article is an in-mold decoration method utilizing decorating sheets of transfer member or the like.

The in-mold decoration method refers to a method including the steps of: sandwiching into a mold a decorating sheet in which a transfer layer composed of a separation layer, a pattern layer, an adhesion layer or the like is formed on a substrate sheet; injecting molten resin into the mold; cooling the molten resin to obtain a resin molded article and, simultaneously, bonding the decorating sheet to the molded article surface; thereafter, separating the substrate sheet and transferring the transfer layer onto a surface of a transfer object, by which decoration is achieved. The in-mold decoration method has a feature that patterns can be formed on even molded articles of such a configuration that patterns are difficult to form directly thereon by a printing process.

For feeding a decorating sheet to a specified position of a mold, use is made of a decorating sheet feeding machine which is so structured that the decorating sheet is rolled out from a rolled long decorating sheet roll placed upward of the mold, made to pass along on the surface of the mold while the transfer-effected substrate sheet is rolled up below the mold. As to the alignment of the decorating sheet fed along the vertical direction as shown above is done through a longitudinal alignment performed by the feed amount of the decorating sheet and a lateral alignment performed by moving the decorating sheet feeding machine itself along the lateral direction (Japanese unexamined patent publication No. S61-297149).

Decoration of both sides of a resin molded article by using the in-mold decoration method is performed as follows. That is, after decorating sheets are set on both a fixed mold-half surface and a movable-mold-half surface, respectively, of an injection mold, the mold is clamped so that the two decorating sheets are sandwiched between the mold halves, and then molten resin is injected to between the two decorating sheets and cooled, by which a resin molded article is obtained, while the decorating sheets are adhesively bonded to both sides of the molded article, and the two substrate sheets are separated so that the transfer layers are transferred to both sides of a transfer object.

SUMMARY OF THE INVENTION

However, in the case where two decorating sheet feeding machines each of which feeds a decorating sheet is installed on the movable mold-half side and the fixed mold-half side along the vertical direction in order to perform the decoration on both sides of the resin molded article, installation spaces of those decorating sheet feeding machines would interfere with each other, causing an issue that wider installation spaces would be involved.

Accordingly, an object of the present invention is to provide an in-mold decoration apparatus, which allows a decorating sheet feeding machine to be installed even with a narrow installation space, as well as the decorating sheet feeding machine, by which the above-described and other issues can be solved.

The in-mold decoration apparatus and the decorating sheet feeding machine of the present invention have the following constitutions to achieve the above-described object.

A first aspect of the present invention provides an in-mold decoration apparatus comprising:

a fixed mold half;

a movable mold half which is provided in opposition to the fixed mold half and movable in such a direction as to separate from and contact with the fixed mold half;

a first decorating sheet feeding machine comprising: a first feed roller which is provided on one mold half side, either the fixed mold half or the movable mold half, for feeding a first decorating sheet in a first direction; and a first take-up roller which is provided at a position opposed to the first direction with respect to the first feed roller with the one mold half sandwiched therebetween, for taking up the first decorating sheet fed from the first feed roller; and a second decorating sheet feeding machine comprising: a second feed roller which is provided on the other mold half side of the fixed mold half or the movable mold half for feeding a second decorating sheet in a second direction intersecting the first direction; and a second take-up roller which is provided at a position opposed to the second direction with respect to the second feed roller with the other mold half sandwiched therebetween, for taking up the second decorating sheet fed from the second feed roller, wherein with the first and second decorating sheets pinched between the fixed mold half and the movable mold half, molten resin is injected into the fixed mold half and the movable mold half so that patterns of the first and second decorating sheets is respectively bonded to surfaces of a resin molded article.

As a second aspect of the present invention, the first direction may be a horizontal direction and the second direction is a vertical direction.

As a third aspect of the present invention, in the in-mold decoration apparatus of the second aspect of the present invention, the first decorating sheet feeding machine further comprises:

an upstream-side sheet guide roller which is positioned on an upstream side of the one mold half, for guiding and supporting the first decorating sheet fed from the first feed roller;

a downstream-side sheet guide roller which is positioned on a downstream side of the one mold half for supporting the first decorating sheet taken up on the first take-up roller;

an upstream-side guide roller moving part for moving the upstream-side sheet guide roller in the vertical direction;

a downstream-side guide roller moving part for moving the downstream-side sheet guide roller in the vertical direction; and a control section for performing alignment of the first decorating sheet with the one mold half by moving the first decorating sheet in the vertical direction by the first and second guide roller moving parts.

As a fourth aspect of the present invention, in the in-mold decoration apparatus of the third aspect of the present invention, the first decorating sheet feeding machine further comprises:

an upstream-side decorating sheet clamp which is provided in proximity to the upstream-side sheet guide roller and which is separable from and contactable with a surface of the upstream-side sheet guide roller; and a downstream-side decorating sheet clamp which is provided in proximity to the downstream-side sheet guide roller and which is separable from and contactable with a surface of the downstream-side sheet guide roller, wherein the first decorating sheet can be fixed by the upstream-side decorating sheet clamp and a surface of the upstream-side sheet guide roller, as well as the downstream-side decorating sheet clamp and a surface of the downstream-side sheet guide roller, respectively making contact with each other and pinching the first decorating sheet.

As a fifth aspect of the present invention, in the in-mold decoration apparatus of the second aspect of the present invention, the first decorating sheet feeding machine further comprises:

an upstream-side frame which is set on an upstream side of the one mold half and holds the first feed roller rotatably and is made movable in a vertical direction relative to the one mold half;

a downstream-side frame which is set on a downstream side of the one mold half and holds the first take-up roller rotatably and is made movable in a vertical direction relative to the one mold half;

an upstream-side frame moving part for moving the upstream-side frame in the vertical direction;

a downstream-side frame moving part for moving the downstream-side frame in the vertical direction; and a control section for performing alignment of the first decorating sheet with the one mold half by moving the first decorating sheet in the vertical direction by the upstream-side frame moving part and the downstream-side frame moving part.

As a sixth aspect of the present invention, in the in-mold decoration apparatus of the fifth aspect of the present invention, the first decorating sheet feeding machine further comprises:

an upstream-side sheet guide roller which is rotatably provided on the upstream-side frame, for guiding and supporting the first decorating sheet fed from the first feed roller;

a downstream-side sheet guide roller which is rotatably provided on the downstream-side frame, for supporting the first decorating sheet taken up on the first take-up roller;

an upstream-side decorating sheet clamp which is provided on the upstream-side frame in proximity to the upstream-side sheet guide roller and which is made separable from and contactable with a surface of the upstream-side sheet guide roller; and a downstream-side decorating sheet clamp which is provided on the downstream-side frame in proximity to the downstream-side sheet guide roller and which is made separable from and contactable with a surface of the downstream-side sheet guide roller, wherein the first decorating sheet can be pinched and thereby fixed by the upstream-side decorating sheet clamp and a surface of the upstream-side sheet guide roller, as well as the downstream-side decorating sheet clamp and a surface of the downstream-side sheet guide roller, making contact with each other, respectively.

As a seventh aspect of the present invention, in a horizontal direction decorating sheet feeding machine for use in an in-mold decoration apparatus having a fixed mold half and a movable mold half provided in opposition movable in such a direction as to separate from and contact with the fixed mold half, wherein with a decorating sheet pinched between the fixed mold half and the movable mold half, molten resin is injected into the fixed mold half and the movable mold half so that a pattern of the decorating sheet is bonded to a surface of a resin molded article, the horizontal direction decorating sheet feeding machine comprises:

a feed roller which is provided on one mold half side, either the fixed mold half or the movable mold half, for feeding a decorating sheet in a horizontal direction;

a take-up roller which is provided at a position horizontally opposed to the feed roller with the one mold half sandwiched therebetween for taking up the decorating sheet fed from the feed roller;

an upstream-side sheet guide roller which is positioned on an upstream side of the one mold half, for guiding and supporting the decorating sheet fed from the feed roller;

a downstream-side sheet guide roller which is positioned on a downstream side of the one mold half, for supporting the decorating sheet taken up on the take-up roller;

an upstream-side guide roller moving part for moving the upstream-side sheet guide roller in the vertical direction;

a downstream-side guide roller moving part for moving the downstream-side sheet guide roller in the vertical direction; and a control section for performing alignment of the decorating sheet with the mold by moving the decorating sheet in the vertical direction by the upstream-side guide roller moving part and the downstream-side guide roller moving part.

As an eighth aspect of the present invention, the horizontal direction decorating sheet feeding machine of the seventh aspect of the present invention further comprises:

an upstream-side decorating sheet clamp which is provided in proximity to the upstream-side sheet guide roller and which is made separable from and contactable with a surface of the upstream-side sheet guide roller;

a downstream-side decorating sheet clamp which is provided in proximity to the downstream-side sheet guide roller and which is made separable from and contactable with a surface of the downstream-side sheet guide roller, wherein the decorating sheet can be fixed by the upstream-side decorating sheet clamp and a surface of the upstream-side sheet guide roller, as well as the downstream-side decorating sheet clamp and a surface of the downstream-side sheet guide roller, respectively making contact with each other and pinching the decorating sheet.

As a ninth aspect of the present invention, in a horizontal direction decorating sheet feeding machine for use in an in-mold decoration apparatus having a fixed mold half and a movable mold half provided movable in such a direction as to separate from and contact with the fixed mold half, wherein with a decorating sheet pinched between the fixed mold half and the movable mold half, molten resin is injected into the fixed mold half and the movable mold half so that patterns of the decorating sheet is respectively bonded to surfaces of a resin molded article, the horizontal direction decorating sheet feeding machine comprises:

a feed roller which is provided on one mold half side, either the fixed mold half or the movable mold half, and which feeds a decorating sheet in a horizontal direction;

a take-up roller which is provided at a position horizontally opposed to the feed roller with the one mold half sandwiched therebetween and which takes up the decorating sheet fed from the feed roller;

an upstream-side frame which is set on an upstream side of the one mold half and holds the feed roller rotatably and is made movable in a vertical direction relative to the one mold half;

a downstream-side frame which is set on a downstream side of the one mold half and holds the take-up roller rotatably and is made movable in a vertical direction relative to the one mold half;

an upstream-side frame moving part for moving the upstream-side frame in the vertical direction;

a downstream-side frame moving part for moving the downstream-side frame in the vertical direction; and a control section for performing alignment of the decorating sheet with the one mold half by moving the decorating sheet in the vertical direction by the upstream-side frame moving part and the downstream-side frame moving part.

As a tenth aspect of the present invention, the horizontal direction decorating sheet feeding machine of the ninth aspect of the present invention, further comprises:

an upstream-side sheet guide roller which is rotatably provided on the upstream-side frame for guiding and supporting the decorating sheet fed from the feed roller;

a downstream-side sheet guide roller which is rotatably provided on the downstream-side frame for supporting the decorating sheet taken up on the take-up roller;

an upstream-side decorating sheet clamp which is provided on the upstream-side frame in proximity to the upstream-side sheet guide roller and which is made separable from and contactable with a surface of the upstream-side sheet guide roller; and a downstream-side decorating sheet clamp which is provided on the downstream-side frame in proximity to the downstream-side sheet guide roller and which is made separable from and contactable with a surface of the downstream-side sheet guide roller.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
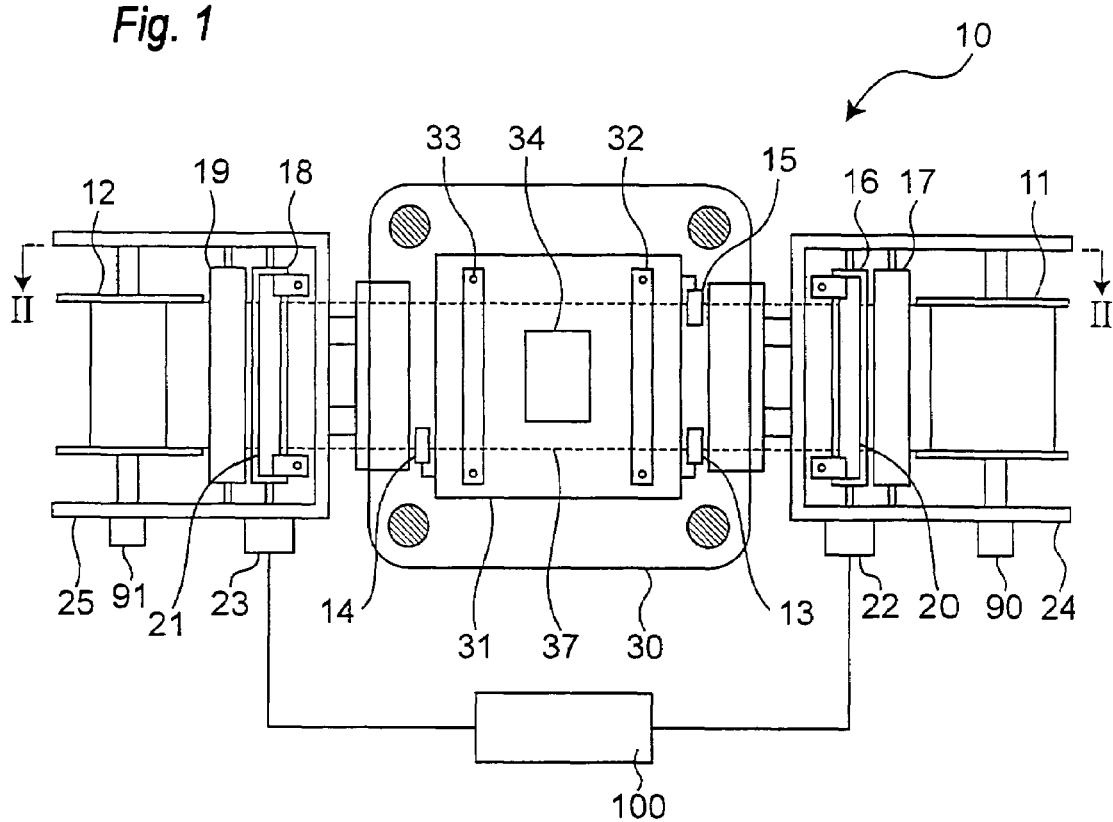
FIG. 1 is a front view showing a horizontal direction decorating sheet feeding machine to be used for the in-mold decoration apparatus according to the embodiment of the present invention.

Before the description of the present invention proceeds, it is to be noted that like parts are designated by like reference numerals throughout the accompanying drawings.

Figure 10:
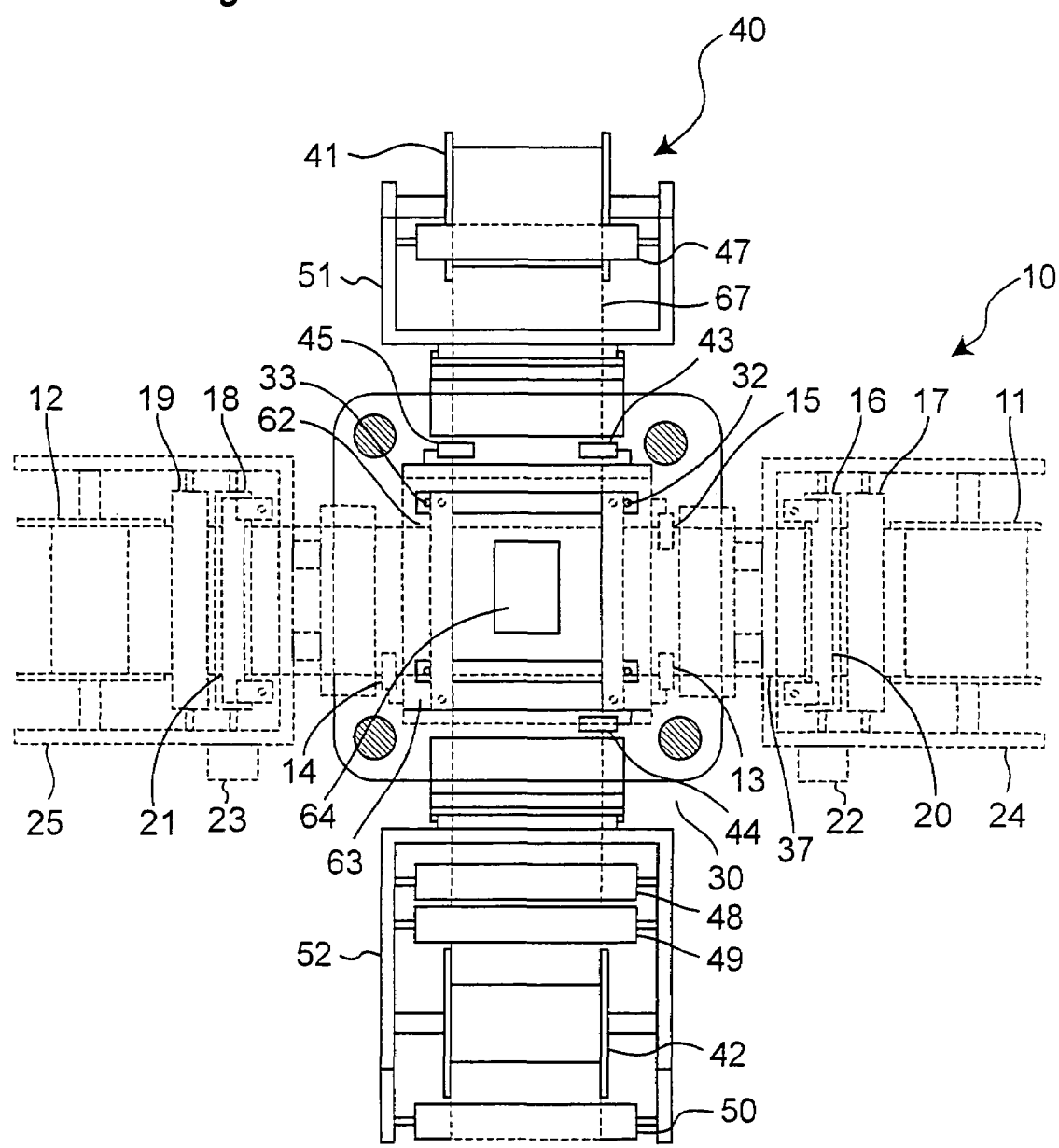
FIG. 10 is a view showing a positional relation between the horizontal direction decorating sheet feeding machine and the vertical direction decorating sheet feeding machine in the in-mold decoration apparatus of FIG. 1.

The in-mold decoration apparatus according to the present invention is an in-mold decoration apparatus which works in such a fashion that, with two decorating sheets 37, 67 sandwiched between a fixed mold half 31 and a movable mold half 61, molten resin is injected from between the two decorating sheets 37, 67 into the mold so that patterns provided on the decorating sheets 37, 67 are bonded to a surface of a resin molded article 81, the in-mold decoration apparatus comprising a vertical direction decorating sheet feeding machine 40 which serves for feeding and rolling up the decorating sheet 67 along a vertical direction and a horizontal direction decorating sheet feeding machine 10 which serves for feeding and rolling up the decorating sheet 37 along a horizontal direction (see FIG. 10).

Figure 11:
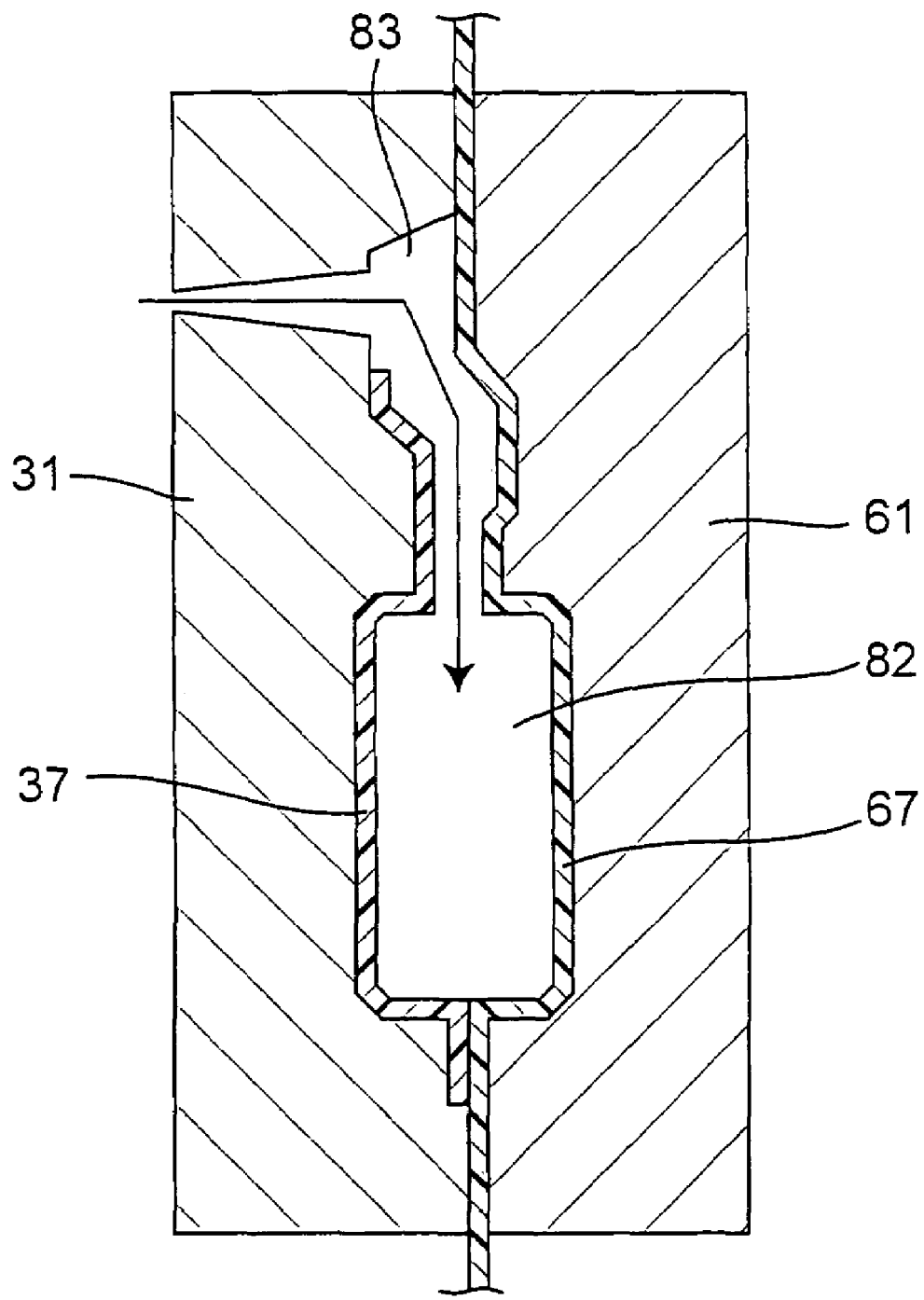
FIG. 11 is a view schematically showing a state in which molten resin is injected into the in-mold decoration apparatus of FIG. 1.

The mold, which is basically composed of the fixed mold half 31 and the movable mold half 61, is so constructed that the mold can be put into a mold-closed state or a mold-open state by the movable mold half 61 being moved in such a direction as to contact with or separate from the fixed mold half 31, and that molten resin can be injected into a cavity space 82 formed by a cavity surface 34 of the fixed mold half 31 and a cavity surface 64 of the movable mold half 61 (see FIG. 11). Because of a necessity that molten resin be injected to between the two decorating sheets 37, 67 to perform both sides of the resin molded article 81, it is preferable, for example, to provide a gate 83 on a side face of the molded article (see FIG. 11).

Further, the mold may comprise such auxiliary members as an intermediate plate (not shown), a molded-article ejecting plate (not shown) and film clamps 32, 33, 62, 63.

First of all, an explanation is given of the horizontal direction decorating sheet feeding machine 10. The horizontal direction decorating sheet feeding machine 10 shown in FIGS. 1 and 2 serves for feeding and rolling up the decorating sheet 37 along the horizontal direction and, for example, a sheet feed roller 11 and upstream-side sheet guide rollers 16, 17 are provided on an upstream-side frame 24 while a sheet take-up roller 12 and downstream-side sheet guide rollers 18, 19 are provided on a downstream-side frame 25. Also, the horizontal direction decorating sheet feeding machine 10 has a first sheet width sensor 13, a second sheet width sensor 14, a sheet length sensor 15, an upstream-side guide roller moving part 22, a downstream-side guide roller moving part 23, and a control section 100.

The sheet feed roller 11, which is driven by a driving member 90, feeds the decorating sheet 37 horizontally so that the decorating sheet 37 is positioned on the surface of the mold 31, and a reel on which the long decorating sheet 37 is taken up is held on the upstream-side frame 24 fitted to a stationary platen 30 (stationary side platen) of the molding machine. For impartment of appropriate tension to the fed decorating sheet 37, a powder clutch (not shown) may be provided on the reel shaft.

An arbitrary number of upstream-side sheet guide rollers 16, 17 are provided on the upstream-side frame 24, in order that the decorating sheet 37 fed from the sheet feed roller 11 is wound therethrough and led to the cavity surface 34 of the mold 31. The upstream-side sheet guide rollers 16, 17 are so made as to be freely rotatable, and the upstream-side sheet guide roller 16 that supports the decorating sheet 37 and that is positioned closest to the mold is so arranged as to be vertically movable by the upstream-side guide roller moving part 22. As the upstream-side guide roller moving part 22, for example, it may be arranged that a ball screw is rotated by a servomotor or a stepping motor to make the shaft of the upstream-side sheet guide roller 16 moved up and down, or that an air cylinder is used to move up and down the shaft of the upstream-side sheet guide roller 16. Further, the upstream-side sheet guide roller 16 may be so arranged as to be up-and-down movable relative to its shaft.

The sheet take-up roller 12 is driven by a driving member 91 to horizontally take up the decorating sheet 37 positioned on the surface of the mold 31, and the reel on which the decorating sheet 37 has been taken up is held on the downstream-side frame 25 fitted to the stationary platen 30. For impartment of appropriate tension to the fed decorating sheet 37, a DC servomotor may be used for the drive of the reel.

An arbitrary number of downstream-side sheet guide rollers 18, 19 are held on the downstream-side frame 25, in order that the decorating sheet 37 that has passed through the cavity surface 34 of the mold is wound therethrough and led to the sheet take-up roller 12. The downstream-side sheet guide rollers 18, 19 are made freely rotatable, and the downstream-side sheet guide roller 18 that supports the decorating sheet 37 and that is positioned closest to the mold is made so as to be vertically movable by the downstream-side guide roller moving part 23. The downstream-side guide roller moving part 23 may be constituted like the upstream-side guide roller moving part 22.

Figure 5:
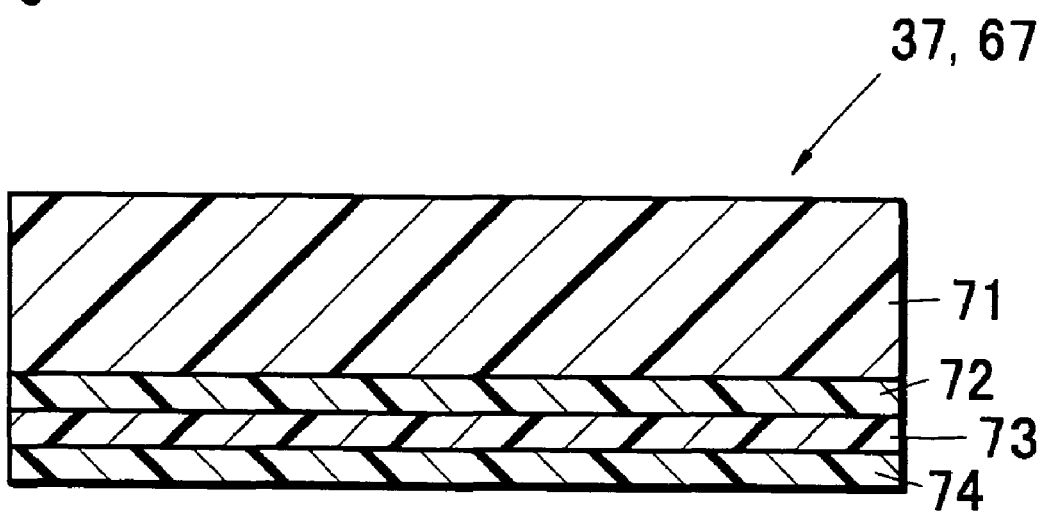
FIG. 5 is a sectional view showing an example of a decorating sheet to be used in the in-mold decoration apparatus of the present invention.

A transfer member is used as the decorating sheet 37. As the transfer member, as shown in FIG. 5, a transfer layer composed of a separation layer 72, a pattern layer 73, an adhesion layer 74 and the like is provided on a surface of the substrate sheet 71. In the case where the transfer layer has good separability from the substrate sheet 71, the transfer layer may be provided directly on the substrate sheet 71. In order to improve the separability of the transfer layer from the substrate sheet 71, before the transfer layer is provided on the substrate sheet 71, a mold releasing layer (not shown) may be formed all over. The pattern layer 73 is a layer representing patterns 75, feed direction marks 76, a widthwise direction mark 77 and the like. The pattern layer 73 is formed of a print layer, a metal thin-film layer or the like on the separation layer 72. Further, in providing the metal thin-film layer, an anchor layer (not shown) may be provided to improve the adhesion between other transfer layers and the metal thin-film layer. The adhesion layer 74 is a layer for adhesively bonding the individual layers to the surface of the resin molded article 81.

Figure 6:
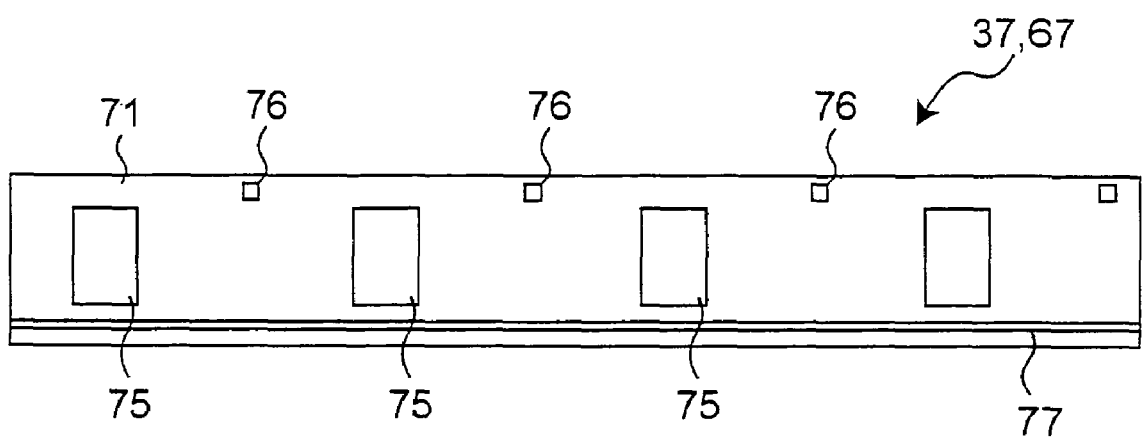
FIG. 6 is a plan view showing an example of the decorating sheet to be used in the in-mold decoration apparatus of the present invention.

On the decorating sheet 37, as shown in FIG. 6, in order that the formed patterns 75 are aligned with the configuration of the cavity 34 of the mold 31, the decorating sheet 37 is provided with the feed direction marks 76 (also referred to as matchmarks) formed in a dot-like shape, pattern 75 by pattern 75, at a constant interval from each pattern 75, as well as the widthwise direction mark 77 (also referred to as flow line) formed in a linear shape at a constant interval from each pattern 75.

Figure 2:
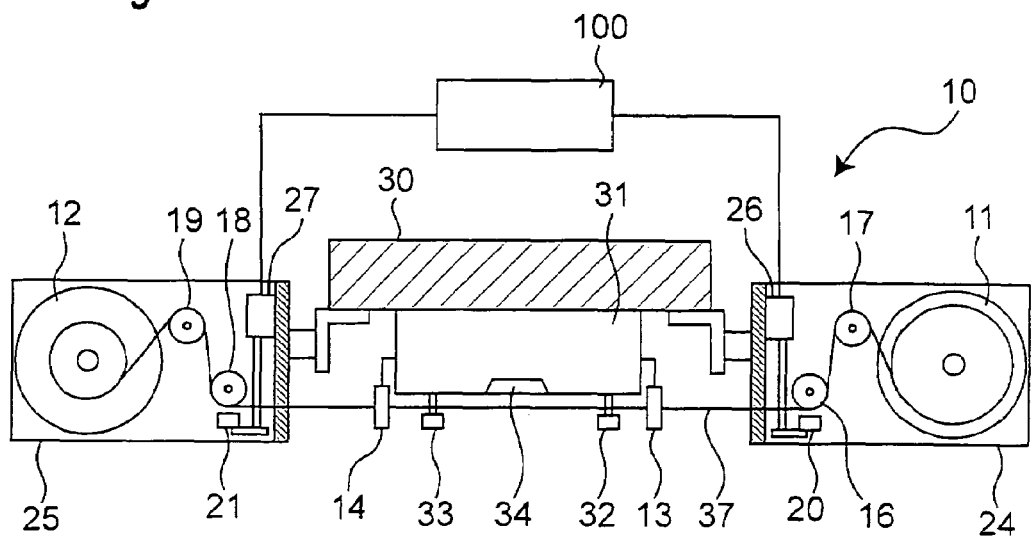
FIG. 2 is a sectional view of the horizontal direction decorating sheet feeding machine of FIG. 1 taken along the line II-II.

As shown in FIG. 1, the sheet length sensor 15 and the first sheet width sensor 13 are set on the upstream side of the mold. Also, the second sheet width sensor 14 is set on the downstream side of the mold.

The decorating sheet 37 is fed from the sheet feed roller 11, wound on the upstream-side sheet guide rollers 16, 17, passed along the cavity surface 34 of the mold, passed through the downstream-side sheet guide rollers 18, 19, and taken up on the sheet take-up roller 12.

As to the feeding of the decorating sheet 37 in the horizontal direction (feed direction of the decorating sheet 37), the decorating sheet 37 is fed out intermittently so that the patterns 75 formed on the decorating sheet 37 are located at specified positions relative to the cavity configuration 34 of the mold.

First, upon input of a signal for a cycle start, the upstream-side sheet guide roller 16 and the downstream-side sheet guide roller 18 are restored to the machine origin, where horizontal feed is started.

When one end of the feed direction mark 76 is detected by the sheet length sensor 15, feed speed of the decorating sheet 37 is reduced. When the other end of the feed direction mark 76 is detected, the decorating sheet 37 is stopped; otherwise, the decorating sheet 37 is fed by a specified length and then stopped.

Next, the decorating sheet 37 is moved in the vertical direction (widthwise direction of the decorating sheet 37). The upstream-side sheet guide roller 16 and the downstream-side sheet guide roller 18 are moved in the vertical direction by the upstream-side guide roller moving part 22 and the downstream-side guide roller moving part 23, respectively, by which the decorating sheet 37 placed on the cavity surface 34 of the mold is moved in the vertical direction. Then, when one end of the widthwise direction mark 77 is detected by the first sheet width sensor 13 and the second sheet width sensor 14, the movement speed of the decorating sheet 37 is reduced. When the other end of the widthwise direction mark 77 is detected, the decorating sheet 37 is stopped; otherwise, the decorating sheet 37 is fed by a specified length and then stopped. Because of a small movement distance in the vertical direction, it may be arranged that the decorating sheet 37 is stopped from moving immediately when one end of the widthwise direction mark 77 is detected by the first sheet width sensor 13 and the second sheet width sensor 14. It is noted that the two sensors, including the first sheet width sensor 13 and the second sheet width sensor 14, for the vertical-direction alignment are used to adjust any inclination of the decorating sheet 37.

It is also possible that rod-shaped decorating sheet clamps 20, 21 for fixing the decorating sheet 37 to surfaces of the upstream-side sheet guide roller 16 and the downstream-side sheet guide roller 18 are provided on the upstream-side frame 24 and the downstream-side frame 25, respectively, where the decorating sheet clamps 20, 21 are put into a released state for horizontal movement of the decorating sheet 37, and into a pinched state for vertical movement of the decorating sheet 37, so that the decorating sheet 37 is moved more securely in the vertical direction. The decorating sheet clamps 20, 21 may be made so as to be driven by using decorating-sheet-clamp drive units 26, 27 exemplified by air cylinders provided on the upstream-side frame 24 and the downstream-side frame 25. Since the decorating sheet clamps 20, 21 are made so as to pinch the decorating sheet 37 and be movable in the vertical direction for the vertical movement of the decorating sheet 37, it is preferable that, for example, the decorating-sheet-clamp drive units 26, 27 can be moved in the vertical direction by the upstream side guide roller moving part 22 and the downstream-side guide roller moving part 23.

The control section 100 works for the individual members of the horizontal direction decorating sheet feeding machine 10 to exert the above-described actions.

As described above, since the vertical direction (widthwise direction) alignment of the vertically oriented decorating sheet 37 is performed by moving one set of sheet guide rollers 16, 18 in the vertical direction, causing only part of the elements constituting the horizontal direction decorating sheet feeding machine 10 to be moved up and down, it becomes possible to perform the positional alignment with a slight driving force.

Further, the in-mold decoration apparatus of this embodiment is so constructed that the upstream side (sheet feed roller 11 side) of the horizontal direction decorating sheet feeding machine becomes the front of the apparatus, and the sheet length sensor 15 and the first sheet width sensor 13 is positioned closer to an operator. By such an arrangement, since sensor alignment is closer to the operator side in the setting of the decorating sheet 37 to the in-mold decoration apparatus, operation for the setting of the decorating sheet 37 is convenient to do, and moreover the alignment of the decorating sheet 37 can be achieved with high precision without using the after-injection-molding substrate sheet 71, which has been deformed fragile due to heat and pressure of the molten resin, for the sensor alignment.

Figure 8:
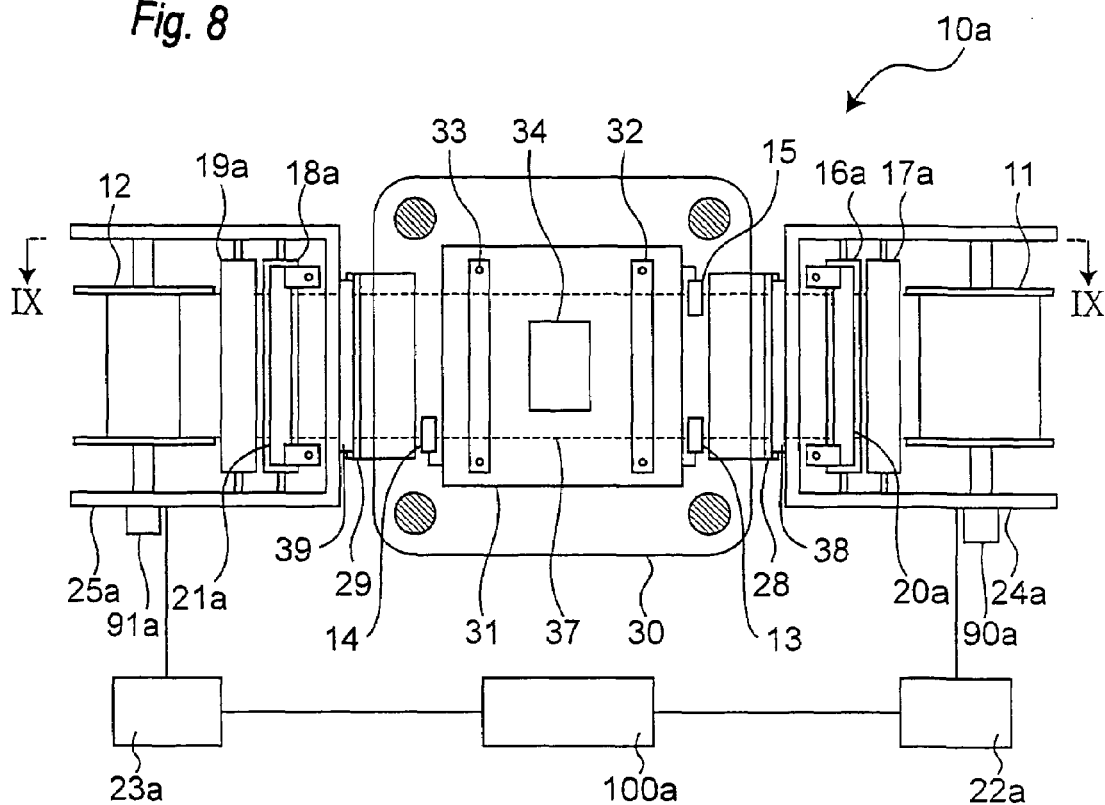
FIG. 8 is a front view showing another aspect of the horizontal direction decorating sheet feeding machine to be used for an in-mold decoration apparatus according to an embodiment of the present invention.
Figure 9:
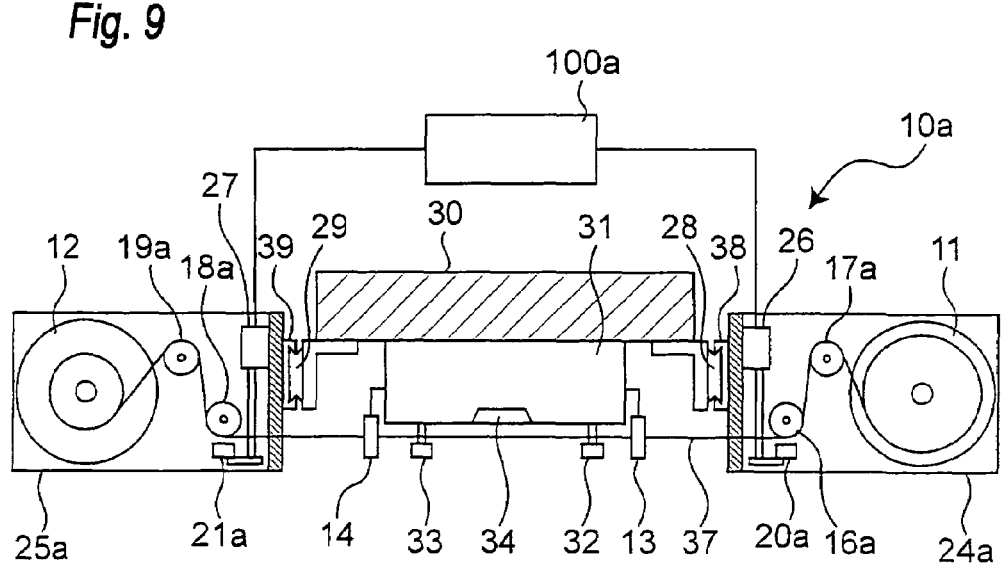
FIG. 9 is a sectional view of the horizontal direction decorating sheet feeding machine of FIG. 8 taken along the line IX-IX.

As a modification, the horizontal direction decorating sheet feeding machine may be so constructed that, as shown in FIGS. 8 and 9, an upstream-side frame 24a and a downstream-side frame 25a are movable in the vertical direction. That is, a horizontal direction decorating sheet feeding machine 10a, which serves to feed and take up the decorating sheet 37 in the horizontal direction, is provided with, for example, a sheet feed roller 11, a sheet take-up roller 12, a first sheet width sensor 13, a second sheet width sensor 14, a sheet length sensor 15, the upstream-side frame 24a, the downstream-side frame 25a, an upstream-side frame moving part 22a, a downstream-side frame moving part 23a, and a control section 100a.

The sheet feed roller 11, which is driven by a driving member 90a, feeds the decorating sheet 37 horizontally so that the decorating sheet 37 is positioned on a surface of the mold 31, and a reel on which the long decorating sheet 37 is taken up is held on the upstream-side frame 24a which is vertically movably fitted to a stationary platen 30 of the molding machine. For impartment of appropriate tension to the fed decorating sheet 37, a powder clutch (not shown) may be provided on the reel shaft. The upstream-side frame 24 is coupled to the stationary platen 30 by a guide rail 28 and a guide 38, and moved vertically by the upstream-side frame moving part 22a as described later.

An arbitrary number of upstream-side sheet guide rollers 16a, 17a are provided on the upstream-side frame 24a, in order that the decorating sheet 37 fed from the sheet feed roller 11 is wound therethrough and led to the cavity surface 34 of the mold 31.

The sheet take-up roller 12 is driven by a driving member 91a to horizontally take up the decorating sheet 37 positioned on the surface of the mold 31, and the reel on which the decorating sheet 37 has been taken up is held on the downstream-side frame 25 vertically movably fitted to the stationary platen 30. For impartment of appropriate tension to the fed decorating sheet 37, a DC servomotor may be used for the drive of the reel. The downstream-side frame 25 is coupled to the stationary platen 30 by a guide rail 29 and a guide 39, and made vertically movable relative to the stationary platen 30 by the downstream-side frame moving part 23a.

In order that the decorating sheet 37 that has passed through the cavity surface 34 of the mold is led to the sheet take-up roller 12, an arbitrary number of downstream-side sheet guide rollers 18a, 19a are held on the downstream-side frame 25a.

In order that the patterns 75 formed on the decorating sheet 37 are aligned with the configuration of the cavity 34 of the mold 31, the decorating sheet 37 is provided with feed direction marks 76 formed in a dot-like shape, pattern by pattern, at a constant interval from each pattern 75, as well as a widthwise direction mark 77 formed in a linear shape at a constant interval from each pattern 75 (see FIG. 6).

The sheet length sensor 15 and the first sheet width sensor 13 are set on the upstream side of the mold. Also, the second sheet width sensor 14 is set on the downstream side of the mold.

The decorating sheet 37 is fed horizontally from the sheet feed roller 11, passed through the upstream-side sheet guide rollers 16a, 17a, passed along the cavity surface 34 of the mold, passed through the downstream-side sheet guide rollers 18a, 19a, and taken up on the sheet take-up roller 12.

As to the feeding of the decorating sheet 37 in the horizontal direction (feed direction of the decorating sheet 37), the decorating sheet 37 is fed out intermittently so that the patterns 75 formed on the decorating sheet 37 are located at specified positions relative to the cavity configuration 34 of the mold.

First, upon input of a signal for a cycle start, the upstream-side frame 24 and the downstream-side frame 25 are restored to the machine origin, where horizontal feed is started.

When one end of a feed direction mark 76 is detected by the sheet length sensor 15, feed speed of the decorating sheet 37 is reduced. When the other end of the feed direction mark 76 is detected, the decorating sheet 37 is stopped; otherwise, the decorating sheet 37 is fed by a specified length and then stopped.

Next, the decorating sheet 37 is moved in the vertical direction (widthwise direction of the decorating sheet 37). The upstream-side frame 24 and the downstream-side frame 25 are moved in the vertical direction by the upstream-side frame moving part 22a and the downstream-side frame moving part 23a, respectively, by which the decorating sheet 37 placed on the cavity surface 34 of the mold is moved in the vertical direction. Then, when one end of the widthwise direction mark 77 is detected by the first sheet width sensor 13 and the second sheet width sensor 14, the movement speed of the decorating sheet 37 is reduced. When the other end of the widthwise direction mark 77 is detected, the decorating sheet 37 is stopped; otherwise, the decorating sheet 37 is fed by a specified length and then stopped. Because of a small movement distance in the vertical direction, it may be arranged that the decorating sheet 37 is stopped from moving immediately when one end of the widthwise direction mark 77 is detected by the first sheet width sensor 13 and the second sheet width sensor 14. It is noted that the two sensors, including the first sheet width sensor 13 and the second sheet width sensor 14, for the vertical-direction alignment are used to adjust any inclination of the decorating sheet 37.

It is also possible that, as shown in FIGS. 8 and 9, rod-shaped decorating sheet clamps 20*a*, 21*a* for fixing the decorating sheet 37 to surfaces of the upstream-side sheet guide roller 16*a* and the downstream-side sheet guide roller 18*a* are provided, where the decorating sheet clamps are put into a released state for horizontal movement of the decorating sheet 37, and into a pinched state for vertical movement of the decorating sheet 37. The decorating sheet clamps 20*a*, 21*a* may be driven by using decorating-sheet-clamp drive units 26, 27 exemplified by air cylinders fixed on the upstream-side frame 24*a* and the downstream-side frame 25*a*. With such a constitution, the decorating sheet 37 pinched horizontally between the sheet feed roller 11 and the sheet take-up roller 12 can effectively be prevented from vertically flexing due to weight of the decorating sheet.

The control section 100*a* works for the individual members of the horizontal direction decorating sheet feeding machine 10*a* to exert the above-described actions.

As described above, the vertical direction (widthwise direction) alignment of the vertically oriented decorating sheet 37 is performed by moving the upstream-side frame 24 and the downstream-side frame 25 in the vertical direction, thereby eliminating the possibility of occurrence of sagging of the decorating sheet 37 that is pinched horizontally between the sheet feed roller 11 and the sheet take-up roller 12 in later-described mold clamping and mold opening processes of the fixed mold half 31 and the movable mold half 61 or other processes. Therefore, it becomes possible to perform the positional alignment while maintaining excellent positional accuracy.

Next, an explanation is given of the vertical direction decorating sheet feeding machine 40. A decorating sheet 67 to be used in the vertical direction decorating sheet feeding machine 40 is similar in constitution to the decorating sheet 37 used in the horizontal direction decorating sheet feeding machine 10, and thus its explanation is omitted.

Figure 3:
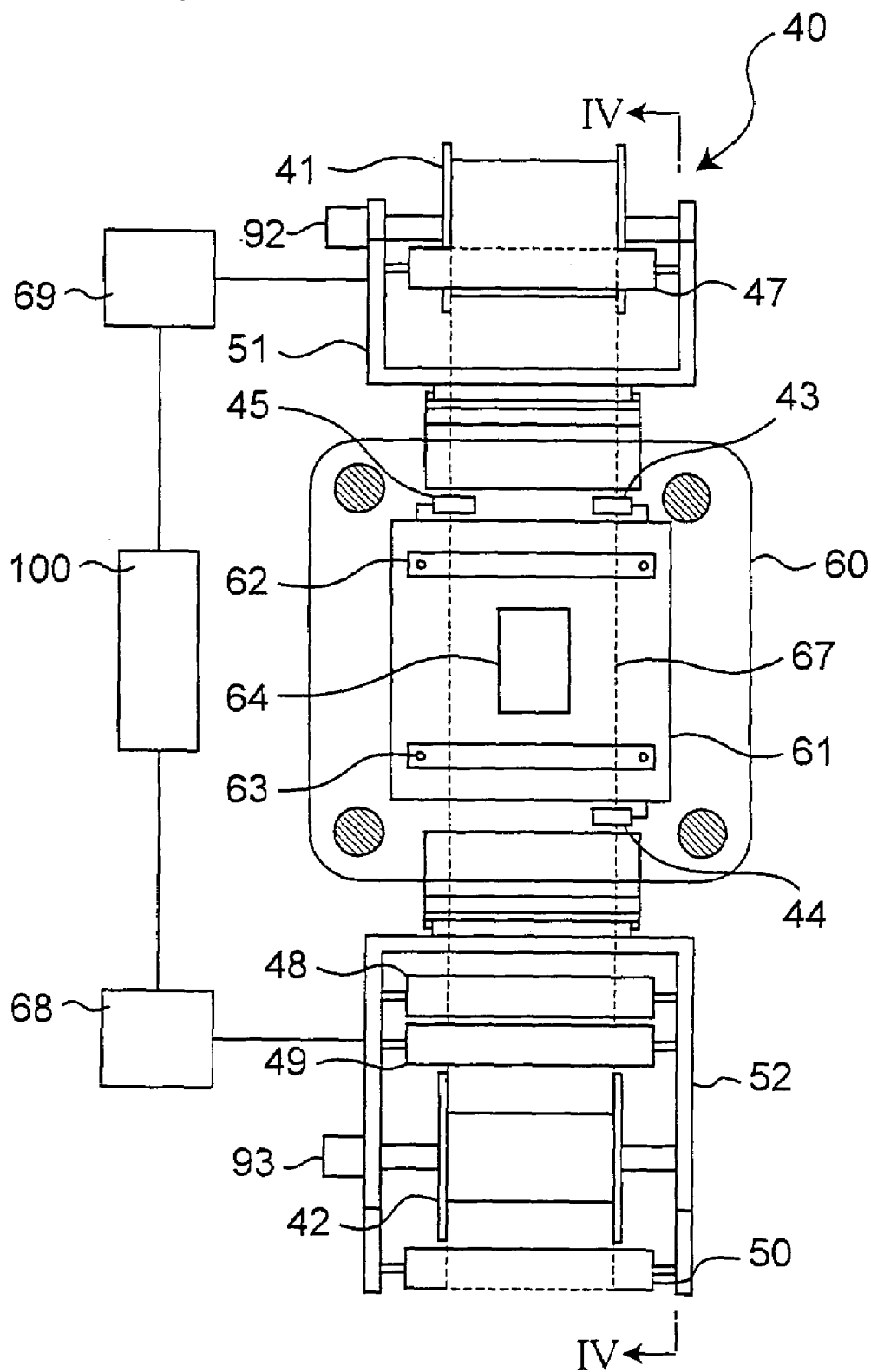
FIG. 3 is a front view showing a vertical direction decorating sheet feeding machine to be used for an in-mold decoration apparatus according to an embodiment of the present invention.
Figure 4:
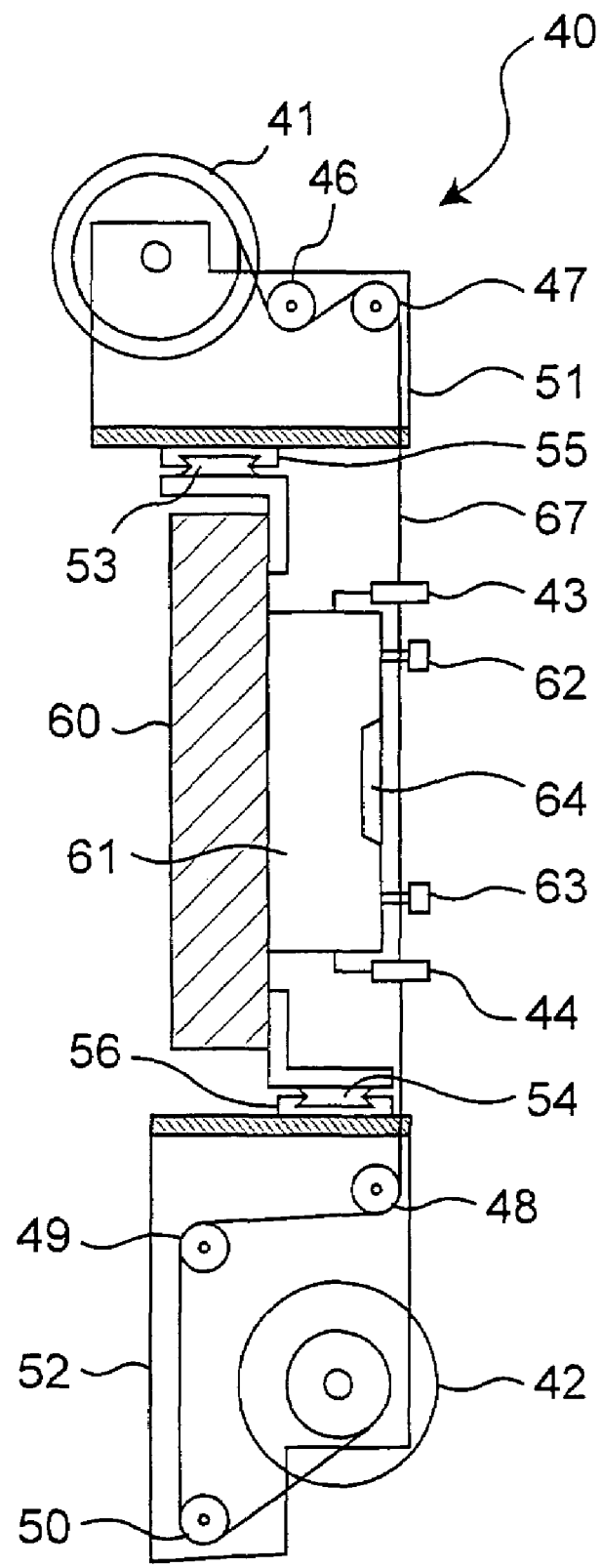
FIG. 4 is a sectional view of the vertical direction decorating sheet feeding machine of FIG. 3 taken along the line IV-IV.

As shown in FIGS. 3 and 4, the vertical direction decorating sheet feeding machine 40, which serves to feed and take up the decorating sheet 67 in the vertical direction, is provided with, for example, a sheet feed roller 41, a sheet take-up roller 42, a first sheet width sensor 43, a second sheet width sensor 44, a sheet length sensor 45, upstream-side sheet guide rollers 46, 47, downstream-side sheet guide rollers 48, 49, 50, an upstream-side frame moving part 69, a downstream-side frame moving part 68, and a control section 100.

The sheet feed roller 41, which is driven by a driving member 92, feeds the decorating sheet 67 vertically so that the decorating sheet 67 is positioned on the surface of the mold 61, and a reel on which the long decorating sheet 67 is taken up is held on an upstream-side frame 51 which is laterally movably fitted to a movable platen 60 (movable side platen) of the molding machine. For impartment of appropriate tension to the fed decorating sheet 67, a powder clutch (not shown) may be provided on the reel shaft. The upstream-side frame 51 is coupled to the movable platen 60 by a guide rail 53 and a guide 55, and made vertically movable relative to the movable platen 60 by the upstream-side frame moving part 69.

In order that the decorating sheet 67 fed vertically from the sheet feed roller 41 is led to the cavity surface 64 of the mold, an arbitrary number of upstream-side sheet guide rollers 46, 47 are provided on the upstream-side frame 51.

The sheet take-up roller 42, which serves to take up the decorating sheet 67 positioned on the surface of the mold 61, and the reel on which the decorating sheet 67 has been taken up is held on the downstream-side frame 52 laterally movably fitted to the movable platen 60 of the molding machine. For impartment of appropriate tension to the fed decorating sheet 67, a DC servomotor may be used for the drive of the reel. The downstream-side frame 52 is coupled to the movable platen 60 by a guide rail 54 and a guide 56, and made horizontally movable relative to the movable platen 60 by the downstream-side frame moving part 68.

In order that the decorating sheet 67 that has passed through the cavity surface 64 of the mold is led to the sheet take-up roller 42, an arbitrary number of downstream-side sheet guide rollers 48, 49, 50 are held on the downstream-side frame 52.

In order that the patterns 75 formed on the decorating sheet 67 are aligned with the configuration of the cavity 64 of the mold 61, the decorating sheet 67 is provided with feed direction marks 76 formed in a dot-like shape, pattern 75 by pattern 75, at a constant interval from each pattern 75, as well as a widthwise direction mark 77 formed in a linear shape at a constant interval from each pattern 75.

The sheet length sensor 45 and the first sheet width sensor 43 are set on the upstream side of the mold. Also, the second sheet width sensor 44 is set on the downstream side of the mold.

The decorating sheet 67 is fed horizontally from the sheet feed roller 41, passed through the upstream-side sheet guide rollers 46, 47, passed along the cavity surface 64 of the mold, passed through the downstream-side sheet guide rollers 48, 49, 50, and taken up on the sheet take-up roller 42.

As to the feeding of the decorating sheet 67 in the vertical direction (feed direction of the decorating sheet 67), the decorating sheet 67 is fed out intermittently so that the patterns 75 formed on the decorating sheet 67 are located at specified positions relative to the cavity configuration 64 of the mold.

First, upon input of a signal for a cycle start, the upstream-side frame 51 and the downstream-side frame 52 are restored to the machine origin, where vertical feed is started.

When one end of a feed direction mark 76 is detected by the sheet length sensor 45, feed speed of the decorating sheet 67 is reduced. When the other end of the feed direction mark 76 is detected, the decorating sheet 67 is stopped; otherwise, the decorating sheet 67 is fed by a specified length and then stopped.

Next, the decorating sheet 67 is moved in the horizontal direction (widthwise direction of the decorating sheet 67). The upstream-side frame 51 and the downstream-side frame 52 are moved in the horizontal direction by the upstream-side frame moving part 69 and the downstream-side frame moving part 68, respectively, by which the decorating sheet 67 placed on the cavity surface 64 of the mold is moved in the horizontal direction. Then, when one end of the widthwise direction mark 77 is detected by the first sheet width sensor 43 and the second sheet width sensor 44, the movement speed of the decorating sheet 67 is reduced. When the other end of the widthwise direction mark 77 is detected, the decorating sheet 67 is stopped; otherwise, the decorating sheet 67 is fed by a specified length and then stopped. Because of a small movement distance in the horizontal direction, it may be arranged that the decorating sheet 67 is stopped from moving immediately when one end of the widthwise direction mark 77 is detected by the first sheet width sensor 43 and the second sheet width sensor 44. It is noted that the two sensors, including the first sheet width sensor 43 and the second sheet width sensor 44, for the horizontal-direction alignment are used to adjust any inclination of the decorating sheet 67.

The control section 100 works for the individual members of the vertical direction decorating sheet feeding machine 40 to exert the above-described actions.

Next, an operation flow of the in-mold decoration apparatus is described. After the positioning of the decorating sheets 37, 67 is completed by using the horizontal direction decorating sheet feeding machine 10 and the vertical direction decorating sheet feeding machine 40, the decorating sheets 37, 67 are put into close contact with the fixed mold half 31 and the movable mold half 61, respectively. Film clamps 32, 33, 62, 63 may preferably be used to obtain the close contact of the decorating sheets 37, 67 with the mold halves. The film clamps 32, 33 provided on the fixed mold half 31 and the film clamps 62, 63 provided on the movable mold half 61 are so devised as to be retreated to recessed portions (not shown) provided in the fixed mold half 31 and the movable mold half 61, respectively, so as not to interfere with each other.

The fixed mold half 31 and the movable mold half 61 may be provided with suction holes (not shown) so as to suck up the decorating sheets 37, 67. Further, the decorating sheets 37, 67 may be heated and thereby softened when the decorating sheets 37, 67 are put into close contact with the fixed mold half 31 and the movable mold half 61, respectively. A heating member therefor may be given by an electrothermal heater (not shown) capable of heating those decorating sheets to temperatures of about 80 to 260° C.

In the case where the decorating sheet 37 is fixed to the surfaces of the upstream-side sheet guide roller 16 and the downstream-side sheet guide roller 18 by using the decorating sheet clamps 20, 21, 20a, 21a, the decorating sheet 37 is put into close contact with the mold and thereafter the decorating sheet clamps 20, 21, 20a, 21a of the horizontal direction decorating sheet feeding machine 10 are released.

Next, the fixed mold half 31 and the movable mold half 61 are clamped. Thereafter, molten resin is injected via the gate 83 provided in the fixed mold half 31 so that the molten resin is passed through between the decorating sheets 37, 67 so as to be injected and filled in the cavity 82 formed in the fixed mold half 31 and the movable mold half 61, by which a resin molded article 81 is formed and, at the same time, the decorating sheets 37, 67 are bonded to both of its surfaces. In the in-mold decoration apparatus according to this embodiment, since the two decorating sheets 37, 67 are so placed as to intersect each other, the gate for making the molten resin reach to between the two decorating sheets 37, 67 can be simplified in construction.

The molten resin may be exemplified by general-purpose resins such as polystyrene resins, polyolefine resins, ABS resins, AS resins and AN resins. Also available therefor are such general-purpose engineering resins as polyphenylene oxide—polystyrene resins, polycarbonate resins, polyacetal resins, acrylic resins, polycarbonate modified polyphenylene ether resins, polybutylene terephthalate resins, polybutylene terephthalate resins, and ultragiant molecular weight polyethylene resins, and such super engineering resins as polysulfone resins, polyphenylene sulfide resins, polyphenylene oxide resins, polyarylate resins, polyether imide resins, polyimide resins, liquid crystal polyester resins, and polyallyl heat-resistant resins. Further, polymer alloys to which such a reinforcing material as glass fiber and inorganic filler is added are also usable.

Figure 7:
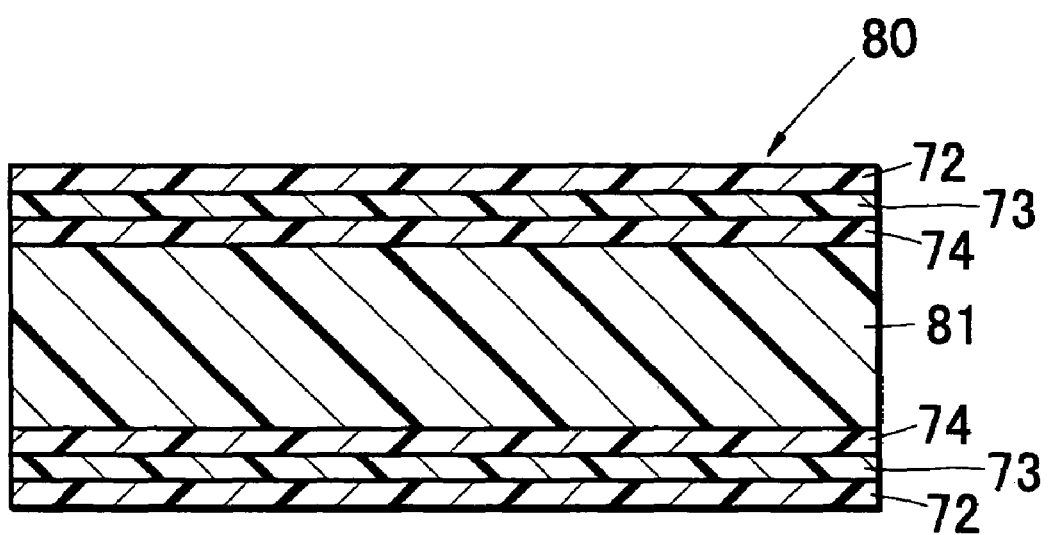
FIG. 7 is a sectional view showing an example of in-mold decorated molded articles formed by the in-mold decoration apparatus according to the present invention.

After the resin molded article 81, which is a transfer object, is cooled, the fixed mold half 31 and the movable mold half 61 are opened and the substrate sheet 71 of the decorating sheets 37, 67 is separated, and then the resin molded article 81 is taken out. In this way, an in-mold decorated molded article 80 in which the transfer layer has been transferred to both sides of the resin molded article 81 can be obtained as shown in FIG. 7.

The in-mold decoration apparatus includes the vertical direction decorating sheet feeding machine 40 for feeding and taking up the decorating sheet 67 in the vertical direction and the horizontal direction decorating sheet feeding machine 10 for feeding and taking up the decorating sheet 37 in the horizontal direction, in which constitution the sheet feed roller 41 and the sheet take-up roller 42 of the vertical direction decorating sheet feeding machine 40 are placed above and below the mold while the sheet feed roller 11 and the sheet take-up roller 12 of the horizontal direction decorating sheet feeding machine 10 are placed right and left of the mold, so that installation spaces of the decorating sheet feeding machines can be prevented from interfering with each other in decorating both sides of the resin molded article by using two decorating sheet feeding machines.

In the above description, the horizontal direction decorating sheet feeding machine 10 is set on the stationary platen 30, while the vertical direction decorating sheet feeding machine 40 is set on the movable platen 60. However, it is also possible that the vertical direction decorating sheet feeding machine 40 is set on the stationary platen 30 while the horizontal direction decorating sheet feeding machine 10 is set on the movable platen 60.

It is further possible that the horizontal direction decorating sheet feeding machine 10 only is set on the stationary platen 30, where the in-mold decoration is performed on one side of the molded article. It is also allowed that the horizontal direction decorating sheet feeding machine 10 only is set on the movable platen 60, where the in-mold decoration is performed on only one side of the molded article. With such a constitution, the in-mold decoration on only one side of the molded article is implementable even when there are less margins of installation spaces above or front and rear of the in-mold decoration apparatus.

Furthermore, insert material may also be used as the decorating sheets 37, 67. In the case of insert material, since the substrate sheet 71 is not separated after the bonding of the decorating sheets 37, 67 to the resin molded article 81, the insert material involves no provision of the separation layer 72, thus differing from a transfer member in layer construction. Further, in order that the decorating sheets 37, 67 can be taken up after the molding, there arises a need for performing such process as punching the decorating sheets 37, 67 within the mold.

The in-mold decoration apparatus of the present invention, which works for pinching a decorating sheet between mold halves, injecting molten resin into the mold, and bonding the decorating sheet to the surface of the resin molded article, includes a vertical direction decorating sheet feeding machine for performing the feed and take-up of the decorating sheet in the vertical direction and a horizontal direction decorating sheet feeding machine for performing the feed and take-up of the decorating sheet in the horizontal direction. Thus, even with narrow installation spaces for the decorating sheet feeding machines in the in-mold decoration apparatus, it is possible to set up the decorating sheet feeding machines.

As described hereinabove, in the in-mold decoration apparatus and the horizontal direction decorating sheet feeding machine according to this embodiment, the decorating sheet is fed and taken up in the horizontal direction and moreover the decorating sheet is moved in the vertical direction by vertically moving one set of sheet guide rollers set on the upstream side and the downstream side of the decorating sheet fed to the mold surface, by which the alignment of the decorating sheet with the mold is accomplished. Thus, even with narrow installation spaces for the decorating sheet feeding machines in the in-mold decoration apparatus, it becomes possible to set up the decorating sheet feeding machines.

Furthermore, in the horizontal direction decorating sheet feeding machine of the present invention, the decorating sheet fed to the mold surface is fed and taken up in the horizontal direction and moreover the decorating sheet is moved in the vertical direction by vertically moving an upstream-side frame, which is provided with a sheet guide roller and which is set on the upstream side of the decorating sheet, and a downstream-side frame, which is provided with a sheet take-up roller and which is set on the downstream side of the decorating sheet, by which the alignment of the decorating sheet with the mold is accomplished. Thus, even with narrow installation spaces for the decorating sheet feeding machines in the in-mold decoration apparatus, it becomes possible to set up the decorating sheet feeding machines.

In addition, the present invention is not limited to the above-described embodiment, and may be embodied in other various modes. For instance, the first and second decorating sheet feeding machines do not necessarily need to be set up so as to feed and take up the decorating sheet in the vertical direction and horizontal direction, respectively. Instead, the decorating sheet feeding machines may be set up so as to intersect with each other with oblique inclinations.

Furthermore, combining any arbitrary embodiments together from among the foregoing various embodiments as required allows their respective effects to be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An in-mold decoration apparatus comprising:
   a fixed mold half;
   a movable mold half provided in opposition to said fixed mold half and movable in such a direction as to separate from and contact with said fixed mold half;
   a first decorating sheet feeding machine comprising
      an upstream-side frame provided on a first side of one mold half of said fixed mold half and said movable mold half,
      a downstream-side frame provided on a second side of said one mold half at a position opposed to said upstream-side frame in a horizontal direction such that said one mold half is disposed between said upstream-side frame and said downstream-side frame,
      a first feed roller provided on said upstream-side frame, for feeding a first decorating sheet in the horizontal direction,
      a first take-up roller provided on said downstream-side frame, for taking up the first decorating sheet fed from said first feed roller,
      an upstream-side sheet guide roller provided on said upstream-side frame so as to be movable in a vertical direction with respect to said upstream-side frame, for guiding and supporting the first decorating sheet fed from the first feed roller;
      a downstream-side sheet guide roller provided on said downstream-side frame so as to be movable in the vertical direction with respect to said downstream-side frame, for supporting the first decorating sheet taken up on the first take-up roller,
      an upstream-side guide roller moving part provided on said upstream-side frame, for moving said upstream-side sheet guide roller in the vertical direction with respect to said upstream-side frame,
      a downstream-side guide roller moving part provided on said upstream-side frame, for moving said downstream-side sheet guide roller in the vertical direction with respect to said downstream-side frame, and
      a control section for performing alignment of the first decorating sheet with said one mold half by controlling said first and second guide roller moving parts to move the first decorating sheet in the vertical direction; and
   a second decorating sheet feeding machine comprising
      a second feed roller provided on a first side of the other mold half of said fixed mold half and said movable mold half, for feeding a second decorating sheet in the vertical direction, and
      a second take-up roller provided on a second side of said other mold half at a position opposed to said second feed roller in the vertical direction such that said other mold half is disposed between said second feed roller and said second take-up roller, for taking up the second decorating sheet fed from said second feed roller;
   wherein, with the first and second decorating sheets pinched between said fixed mold half and said movable mold half, molten resin can be injected into said fixed mold half and said movable mold half so that patterns of the first and second decorating sheets are respectively bonded to surfaces of a resin molded article.

2. The in-mold decoration apparatus according to claim 1, wherein said first decorating sheet feeding machine further comprises:
   an upstream-side decorating sheet clamp provided in proximity to said upstream-side sheet guide roller and being separable from and contactable with a surface of said upstream-side sheet guide roller; and
   a downstream-side decorating sheet clamp provided in proximity to said downstream-side sheet guide roller and being separable from and contactable with a surface of said downstream-side sheet guide roller;
   wherein the first decorating sheet can be fixed by said upstream-side decorating sheet clamp and a surface of said upstream-side sheet guide roller, as well as said downstream-side decorating sheet clamp and a surface of said downstream-side sheet guide roller, respectively making contact with each other and pinching the first decorating sheet.

3. A horizontal direction decorating sheet feeding machine for use in an in-mold decoration apparatus having a mold including a fixed mold half and a movable mold half provided in opposition and movable in such a direction as to separate from and contact with the fixed mold half, wherein with a decorating sheet pinched between the fixed mold half and the movable mold half, molten resin can be injected into the fixed mold half and the movable mold half so that a pattern of the decorating sheet is bonded to a surface of a resin molded article, said horizontal direction decorating sheet feeding machine comprising:

an upstream-side frame configured to be provided on a first side of one mold half of the fixed mold half and the movable mold half;

a downstream-side frame configured to be provided on a second side of the one mold half at a position opposed to said upstream-side frame in a horizontal direction such that the one mold half is disposed between said upstream-side frame and said downstream-side frame;

a feed roller provided on said upstream-side frame, for feeding a decorating sheet in a horizontal direction;

a take-up roller provided on said downstream-side frame, for taking up the decorating sheet fed from said feed roller;

an upstream-side sheet guide roller provided on said upstream-side frame so as to be movable in the vertical direction with respect to said upstream-side frame, for guiding and supporting the decorating sheet fed from said feed roller;

a downstream-side sheet guide roller provided on said downstream-side frame so as to be movable in the vertical direction with respect to said downstream-side frame, for supporting the decorating sheet taken up on said take-up roller;

an upstream-side guide roller moving part provided on said upstream-side frame, for moving said upstream-side sheet guide roller in the vertical direction with respect to said upstream-side frame;

a downstream-side guide roller moving part provided on said downstream-side frame, for moving said downstream-side sheet guide roller in the vertical direction with respect to said downstream-side frame; and a control section for performing alignment of the decorating sheet with the mold by controlling said upstream-side guide roller moving part and said downstream-side guide roller moving part to move the decorating sheet in the vertical direction.

4. The horizontal direction decorating sheet feeding machine according to claim 3, further comprising:

an upstream-side decorating sheet clamp provided in proximity to said upstream-side sheet guide roller and being separable from and contactable with a surface of said upstream-side sheet guide roller; and a downstream-side decorating sheet clamp provided in proximity to said downstream-side sheet guide roller and being separable from and contactable with a surface of said downstream-side sheet guide roller, wherein the decorating sheet can be fixed by said upstream-side decorating sheet clamp and a surface of said upstream-side sheet guide roller, as well as said downstream-side decorating sheet clamp and a surface of said downstream-side sheet guide roller, respectively making contact with each other and pinching the decorating sheet.

* * * * *